(12) United States Patent
Namekawa et al.

(10) Patent No.: US 11,882,420 B2
(45) Date of Patent: Jan. 23, 2024

(54) AUDIO SIGNAL SYNCHRONIZATION CONTROL DEVICE AND AUDIO DEVICE

(71) Applicant: SONY SEMICONDUCTOR SOLUTIONS CORPORATION, Kanagawa (JP)

(72) Inventors: Nobuo Namekawa, Kanagawa (JP); Yutaka Takagi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 245 days.

(21) Appl. No.: 17/431,484

(22) PCT Filed: Jan. 22, 2020

(86) PCT No.: PCT/JP2020/002116
§ 371 (c)(1),
(2) Date: Aug. 17, 2021

(87) PCT Pub. No.: WO2020/174943
PCT Pub. Date: Sep. 3, 2020

(65) Prior Publication Data
US 2022/0150631 A1   May 12, 2022

(30) Foreign Application Priority Data
Feb. 26, 2019   (JP) ................... 2019-032462

(51) Int. Cl.
*H04R 5/04*   (2006.01)
*G06F 1/08*   (2006.01)
(Continued)

(52) U.S. Cl.
CPC ............... *H04R 5/04* (2013.01); *G06F 1/08* (2013.01); *G06F 1/12* (2013.01); *G06F 9/542* (2013.01); *H04R 3/12* (2013.01)

(58) Field of Classification Search
CPC .... H04R 5/04; H04R 3/12; G06F 1/08; G06F 1/12; G06F 9/542
See application file for complete search history.

(56) References Cited

U.S. PATENT DOCUMENTS 6,970,569 B1   11/2005 Yamada
2003/0128702 A1   7/2003 Satoh et al.
(Continued)

FOREIGN PATENT DOCUMENTS

CA   2882321 A1 *  6/2013   ............. B65H 23/04
CN   101256543 A     9/2008
(Continued)

OTHER PUBLICATIONS

International Search Report and Written Opinion of PCT Application No. PCT/JP2020/002116, dated Mar. 31, 2020, 08 pages of ISRWO.

*Primary Examiner* — Andrew L Sniezek
(74) *Attorney, Agent, or Firm* — CHIP LAW GROUP

(57) ABSTRACT

An audio signal synchronization control device of the present disclosure includes a host controller, a plurality of audio devices, a communication unit capable of performing broadcast communication for controlling the plurality of audio devices from the host controller, and a clock oscillator that supplies a master clock of the same source oscillation to the plurality of audio devices. The host controller performs broadcast communication with a plurality of audio devices using a synchronization address. Each of the plurality of audio devices includes a synchronization control unit that generates a synchronization reset signal in a case where broadcast communication is performed by a synchronization address, a clock reset control unit that generates a timing signal in response to the synchronization reset signal, and an (Continued)

audio signal processing unit that processes audio data in accordance with the timing signal.

20 Claims, 9 Drawing Sheets

(51) Int. Cl.
*G06F 1/12* (2006.01)
*G06F 9/54* (2006.01)
*H04R 3/12* (2006.01)

(56) References Cited

U.S. PATENT DOCUMENTS

2008/0201507 A1     8/2008   Krampl et al.
2013/0322462 A1*   12/2013   Poulsen .................... H04L 7/10
                                                                                           370/458

FOREIGN PATENT DOCUMENTS

| DE | 19952300 A1 | 5/2000 |
|---|---|---|
| EP | 1326172 A2 | 7/2003 |
| EP | 1962198 A1 | 8/2008 |
| JP | 02-240894 A | 9/1990 |
| JP | 2000-138998 A | 5/2000 |
| JP | 2003-196230 A | 7/2003 |
| JP | 2017-135709 A | 8/2017 |
| JP | 2017-135711 A | 8/2017 |
| KR | 10-2000-0047558 A | 7/2000 |

\* cited by examiner

AUDIO SIGNAL SYNCHRONIZATION CONTROL DEVICE AND AUDIO DEVICE

CROSS REFERENCE TO RELATED APPLICATIONS

This application is a U.S. National Phase of International Patent Application No. PCT/JP2020/002116 filed on Jan. 22, 2020, which claims priority benefit of Japanese Patent Application No. JP 2019-032462 filed in the Japan Patent Office on Feb. 26, 2019. Each of the above-referenced applications is hereby incorporated herein by reference in its entirety.

TECHNICAL FIELD

The present disclosure relates to an audio signal synchronization control device and an audio device.

BACKGROUND ART

There is a method in which a common external interrupt line is wired for a plurality of slave devices to generate a synchronization signal from a host controller via a general-purpose input/output pin (GPIO), and the slave device side processes the synchronization signal as an external interrupt to achieve synchronization. In the case of this method, it is necessary to control a general-purpose input/output pin (GPIO) separately from register access by an inter-integrated circuit ($I^2C$) (registered trademark) bus (hereinafter, referred to as an "I2C bus") from the host controller, and it is necessary to separately wire an external interrupt line for synchronization between the host controller and the slave devices.

There are a technique described in Patent Document 1 and a technique described in Patent Document 2 as conventional techniques for achieving synchronization between slave devices while using an interface such as an existing I2C bus without wiring a common external interrupt line to a plurality of slave devices. Patent Document 1 describes a technique of "slave-to-slave synchronous communication", and Patent Document 2 describes a technique of "GPIO to GPIO communication in a daisy-chained multi-node network".

CITATION LIST

Patent Document

Patent Document 1: Japanese Patent Application Laid-Open No. 2017-135711
Patent Document 2: Japanese Patent Application Laid-Open No. 2017-135709

SUMMARY OF THE INVENTION

Problems to be Solved by the Invention

In the conventional techniques described in Patent Document 1 and Patent Document 2 described above, it is not necessary to wire a common external interrupt line to a plurality of slave devices, but it is necessary to add a master node and slave nodes connected by a new two-wire bus between the host controller and the plurality of slave devices.

By the way, in recent years, in the field of audio, completely wireless headphones with separate left channel (Lch) and right channel (Rch) have been sold by various companies, and monaural audio devices with small size and low power consumption have been developed. It is desired that this monaural audio device is connected as a plurality of slave devices and can be used in stereo or multichannel.

An object of the present disclosure is to provide a technology capable of connecting a monaural audio device as a plurality of slave devices and synchronously controlling the plurality of audio devices while maintaining an existing bus network topology without adding an external interrupt signal for synchronization so that the audio devices can be used in stereo or multichannel.

Solutions to Problems

An audio signal synchronization control device of the present disclosure for achieving the above object includes:
a host controller;
a plurality of audio devices;
a communication unit capable of performing broadcast communication, having a device control address separately set for the plurality of the audio devices and a synchronization address common to the devices, and configured to control the plurality of the audio devices from the host controller; and
a clock oscillator that supplies a clock of the same source oscillation to the plurality of audio devices as a master clock, Then, the host controller performs broadcast communication with a plurality of audio devices using a synchronization address.

Each of the plurality of the audio devices includes: a synchronization control unit that generates a synchronization reset signal in a case where the broadcast communication is performed with the synchronization address;
a clock reset control unit that generates a timing signal in response to the synchronization reset signal generated by the synchronization control unit; and
an audio signal processing unit that processes audio data in accordance with the timing signal generated by the clock reset control unit.

Furthermore, the audio device of the present disclosure for achieving the above object uses the audio signal synchronization control device having the above configuration.

MODE FOR CARRYING OUT THE INVENTION

Figure 1:
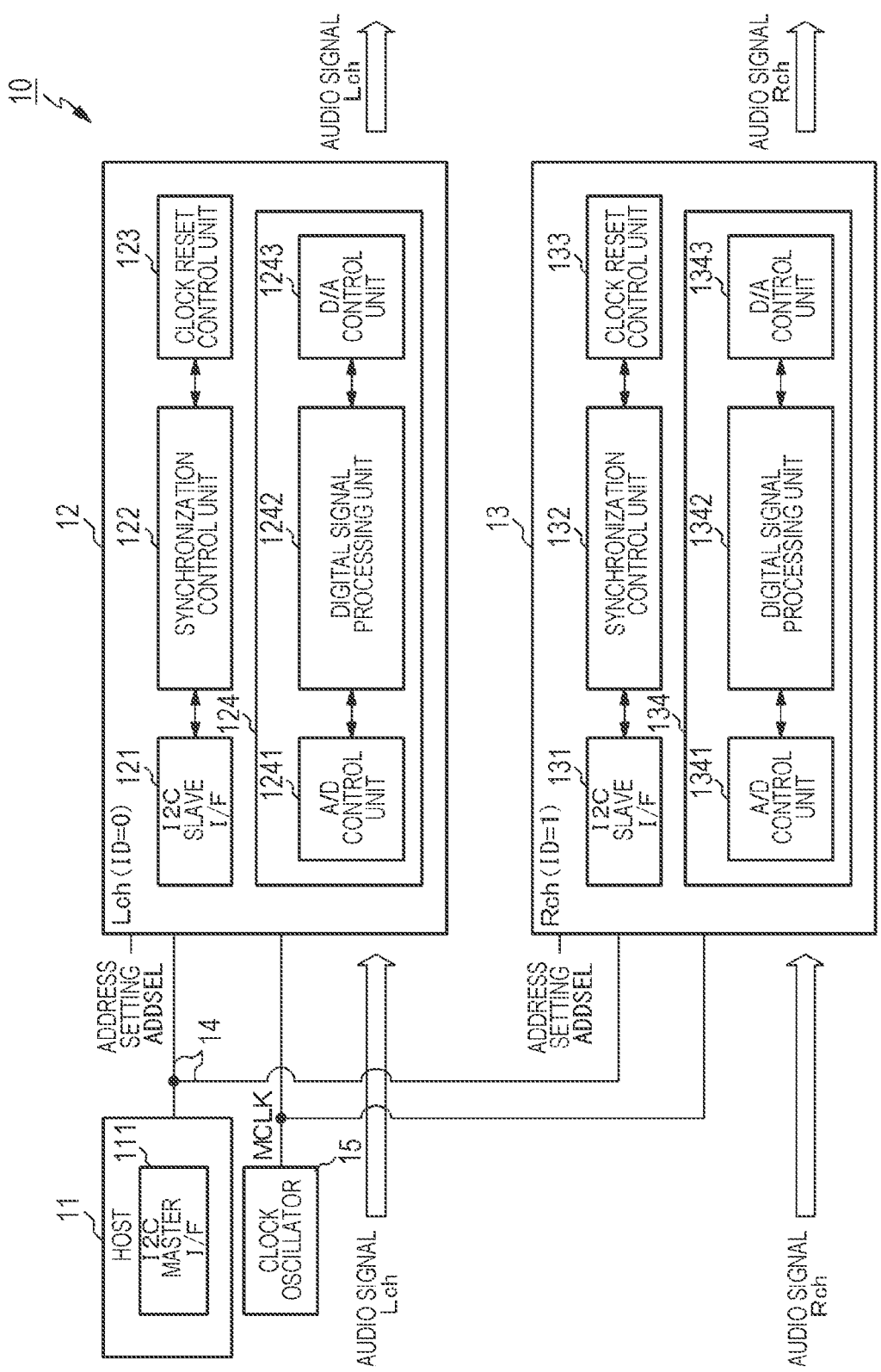
FIG. 1 is a block diagram illustrating a system configuration of an audio signal synchronization control device according to a first embodiment of the present disclosure.

Hereinafter, modes for carrying out the technology of the present disclosure (hereinafter, referred to as "embodiment") will be described in detail with reference to the drawings. The technology of the present disclosure is not limited to the embodiments, and various numerical values and the like in the embodiments are examples. In the following description, the same reference signs will be used for the same elements or elements having the same functions, and redundant description will be omitted. Note that the description will be given in the following order.

1. General Description of Audio Signal Synchronization Control Device and Audio Device of Present Disclosure
2. First Embodiment of Present Disclosure (Configuration Example of Synchronization Control of Plurality of Audio Devices by Broadcast Communication Command)
    2-1. System Configuration (Example of Two Slave Devices)
    2-2. Configuration Example of Lch Audio Device
    2-3. Configuration Example of Rch Audio Device
    2-4. Procedure of Synchronization Control in Synchronization Control Unit
    2-5. Application Example of First Embodiment (Example of Three or More Slave Devices)
3. Second Embodiment of Present Disclosure (Example of Implementing Synchronization Control with Configuration in Which Audio Signal Processing Unit is Separated into Plurality of Monaural Analog Circuit Units and Stereo Digital Circuit Unit)
    3-1. System Configuration
    3-2. Configuration Example of Digital Circuit Unit
    3-3. Configuration Example of Analog Circuit Unit of Lch
    3-4. Configuration Example of Analog Circuit Unit of Rch
    3-5. Fine Adjustment of Synchronization Start Timing
    3-6. Flow of Audio Signal Processing
    3-7. Procedure of Synchronization Control of Second Embodiment
4. Third Embodiment of Present Disclosure (Example of Audio Device)
5. Configuration that Can Be Adopted by Present Disclosure <General Description of Audio Signal Synchronization Control Device and Audio Device of Present Disclosure>

In an audio signal synchronization control device and an audio device of the present disclosure, the communication unit may be a bus topology capable of broadcast communication, preferably an I2C bus.

In the audio signal synchronization control device and the audio device of the present disclosure including the preferable configuration described above, in a case where a broadcast communication command with a synchronization address common to devices is received for a plurality of audio devices, the broadcast communication command can be simultaneously accepted by the plurality of devices, and an ACK response can be made only by a predetermined audio device based on device identification information. Moreover, in a case where a broadcast communication command with a device control address is received for a plurality of audio devices, only the selected audio device can respond.

Furthermore, in the audio signal synchronization control device and the audio device of the present disclosure including the preferable configuration described above, the synchronization control unit can be configured to start synchronization reset and cancel the reset after a predetermined time has elapsed in a case where broadcast communication is performed using the synchronization address. Furthermore, the clock reset control unit can be configured to generate pulse clocks having frequencies of 1 $f_s$, 2 $f_s$, 4 $f_s$, and 128 $f_s$ in a case where the frequency of the master clock is 512 times the sampling frequency $f_s$ of the audio data.

Furthermore, in the audio signal synchronization control device and the audio device of the present disclosure including the preferable configuration described above, an audio signal processing unit can be configured to process audio data according to the register contents set with the device control address and the synchronization address.

Furthermore, in the audio signal synchronization control device and the audio device of the present disclosure including the preferable configuration described above, the audio signal processing unit can include a monaural multi-channel analog circuit unit and a stereo digital circuit unit. Then, the host controller and the analog circuit units of the plurality of channels are preferably connected by an I2C bus.

Furthermore, in the audio signal synchronization control device and the audio device of the present disclosure including the preferable configuration described above, a digital controller (host controller) is built in the digital circuit unit, and the digital controller can be a host controller having an interface different from the I2C bus.

Moreover, in the audio signal synchronization control device and the audio device of the present disclosure including the preferable configuration described above, the digital circuit unit may be provided with a clock synchronization control unit for performing synchronization control, and the digital controller may be configured to supply a synchronization start timing signal for performing synchronization control to the clock synchronization control unit. The synchronization start timing signal is preferably a signal that transmits the synchronization start timing to the analog circuit units of the plurality of channels starting from the digital circuit unit.

Furthermore, in the audio signal synchronization control device and the audio device of the present disclosure including the preferable configuration described above, the clock synchronization control unit can be configured to perform synchronization control on the basis of a synchronization start timing signal given from the digital controller.

Moreover, in the audio signal synchronization control device and the audio device of the present disclosure including the preferable configuration described above, the clock synchronization control unit may include a synchronization start timing fine adjustment unit capable of delaying the synchronization start timing to be transmitted to the synchronization control unit from the command issuance timing in units of master clocks. Furthermore, the synchronization start timing fine adjustment unit can be configured to generate a toggle signal indicating the start timing of the synchronization reset signal and supply the toggle signal to the synchronization control unit.

Moreover, in the audio signal synchronization control device and the audio device of the present disclosure including the preferable configuration described above, the synchronization control unit can be configured to receive the toggle signal from the synchronization start timing fine adjustment unit, generate the synchronization reset signal, and supply the synchronization reset signal to the clock reset control unit. Furthermore, the clock reset control unit can be configured to perform synchronous reset over a preset period and start clock generation from synchronous reset cancellation.

Moreover, in the audio signal synchronization control device and the audio device of the present disclosure including the preferable configuration described above, the digital circuit unit can be configured to receive a synchronization control command from the digital controller, perform synchronous reset for a period designated in advance, and perform clock generation again with the reset release timing as a starting point.

First Embodiment

A first embodiment of the present disclosure is a configuration example of synchronization control of a plurality of audio devices by a broadcast communication command. FIG. 1 illustrates a block diagram of a system configuration of an audio signal synchronization control device according to the first embodiment. Herein, an audio device of a left channel (hereinafter, referred to as "Lch") and an audio device of a right channel (hereinafter, referred to as "Rch") are exemplified as the plurality of slave devices, but the slave devices are not limited to two channels of Lch and Rch, and may be audio devices of three or more channels.

[System Configuration]

An audio signal synchronization control device 10 according to the first embodiment includes a host controller 11, an Lch audio device 12, and an Rch audio device 13. Then, the host controller 11 and a plurality of slave devices, that is, the Lch audio device 12 and the Rch audio device 13 are connected by the I2C bus 14 which is an example of an existing bus network topology (serial communication bus).

The I2C bus 14 connects the host controller 11 and the plurality of slave devices in a party line shape by two signal lines, a serial clock line (SCL) and a serial data line (SDA). In this system configuration, the host controller 11 always has authority, and a data signal is transferred on the signal line SDA with reference to a clock transmitted by the host controller 11.

Herein, the I2C bus is exemplified as a communication unit for controlling the audio devices 12 and 13 of Lch and Rch from the host controller 11, but the communication unit is not limited to the I2C bus. That is, only the connection of the bus network topology is required, which is an example of the communication unit enabling the broadcast communication to simultaneously transmit notification of the same contents to the plurality of slave devices.

The host controller 11 is equipped with a master interface (I/F) 111 of the I2C bus standard. Furthermore, the audio devices 12 and 13 of Lch and Rch are equipped with slave interfaces 121 and 131 of the I2C bus standard as described later. Then, the host controller 11 and the audio devices 12 and 13 of Lch and Rch are connected by an I2C bus 14. The two signal lines SCL and SDA of the I2C bus 14 are connected to be shared by the Lch audio device 12 and the Rch audio device 13.

The Lch audio device 12 and the Rch audio device 13 are devices that process monaural audio signals. An Lch audio signal is inputted into the Lch audio device 12, and an Rch audio signal is inputted into the Rch audio device 13.

The audio signal synchronization control device 10 according to the first embodiment includes a clock oscillator 15 in addition to the host controller 11 and the audio devices 12 and 13 of Lch and Rch. The clock oscillator 15 generates clocks of the same source oscillation for the plurality of slave devices, that is, the audio devices 12 and 13 of Lch and Rch, and supplies the clocks as the master clock MCLK to the audio devices 12 and 13 of Lch and Rch.

Different slave addresses corresponding to the IDs unique to the audio devices 12 and 13 of Lch and Rch are set in advance in the audio devices 12 and 13 of Lch and Rch prior to the transmission of the I2C command from the host controller 11. The slave address of the I2C bus 14 is 7 bits or 10 bits according to the standard. Herein, the lower 1 bit of the 7-bit slave address can be changed by the address setting pin ADDSEL of the audio devices 12 and 13.

Then, in a case where the slave device is distinguished using the lower 1 bit as the ID value, the address setting pin is electrically fixed to ADDSEL=0 (Low level) for the Lch of ID=0, and the address setting pin is electrically fixed to ADDSEL=1 (High level) for the Rch of ID=1. Therefore, the host controller 11 can individually control the slave devices, that is, the Lch audio device 12 and the Rch audio device 13.

Hereinafter, an address for individually controlling the slave devices from the host controller 11 is referred to as a device control address, and an address common to the devices regardless of the IDs of these devices is referred to as a synchronization address.

For the setting of the slave address, an ID may be written in advance in the nonvolatile memory, and the sum of the ID value and the base address may be communicable as the slave address.

The I2C bus 14, which is a communication unit between the host controller 11 and the slave devices (i.e., the Lch audio device 12 and the Rch audio device 13), has the following two addresses (a) and (b).

(a) Device Control Address Separately Set for Slave Device ID
(b) Synchronization Address Common to Devices Independent from Slave Device IDs Configuration Example of Lch Audio Device The Lch audio device 12 and the Rch audio device 13 have the same configuration except for having different IDs. Therefore, the configuration of the Lch audio device 12 will be described in detail below.

The Lch audio device 12 includes an I2C slave interface 121, a synchronization control unit 122, a clock reset control unit 123, and an audio signal processing unit 124.

I2C Slave Interface

The I2C slave interface 121 identifies whether the data transmitted from the host controller 11 through the I2C bus 14 is an address for device control or an address for synchronization common to devices. Then, in a case of the broadcast communication command at the address for synchronization, in the I2C slave interface 121, only a predetermined audio device based on the device identification information (ID), specifically, only the Lch audio device 12 with ID=0, performs the ACK response, and the devices other than ID=0 do not perform the ACK response. That is, even when the synchronization command is broadcasted from the host controller 11 to the plurality of slave devices, the plurality of slave devices is prevented from responding to ACK at the same time. Therefore, unnecessary power consumption due to simultaneous responses from a plurality of slave devices can be eliminated so that an increase in power consumption of the entire system can be suppressed.

Figure 2:
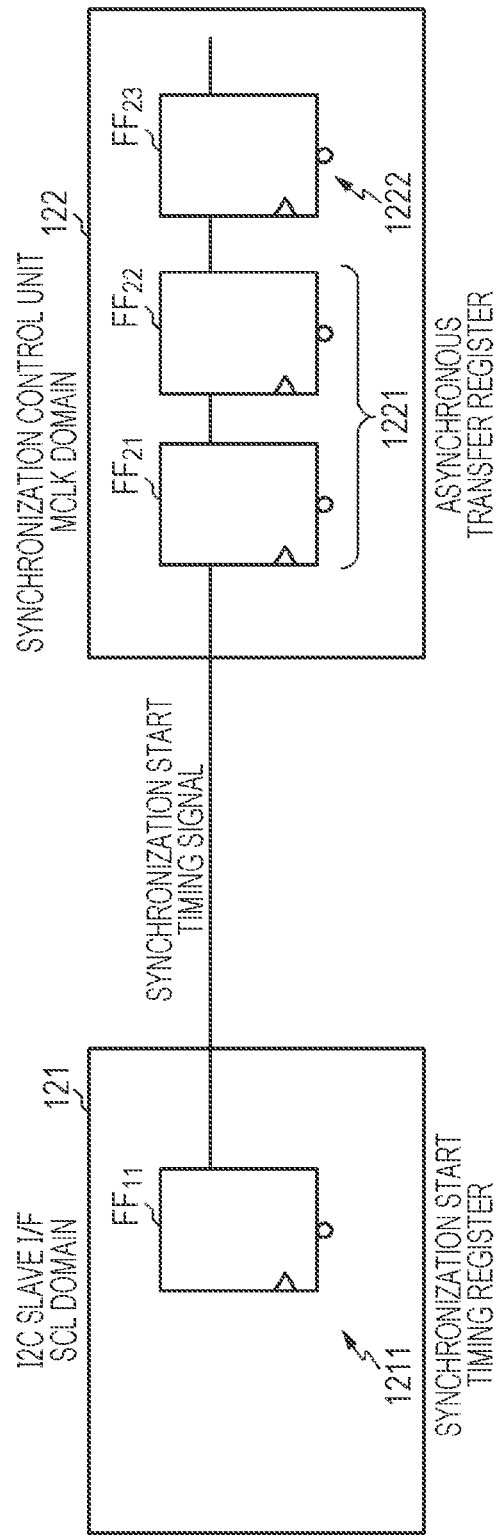
FIG. 2 is a block diagram for explaining details of the I2C slave interface and the synchronization control unit.

Details of the I2C slave interface 121 and the synchronization control unit 122 will be described with reference to FIG. 2. In the I2C slave interface 121, for example, a synchronization start timing register 1211 for synchronization control including a one-stage flip-flop $FF_{11}$ is prepared. Although not illustrated, a reset time setting register and the like are also prepared in the I2C slave interface 121. In the synchronization control unit 122, for example, an asynchronous transfer register 1221 including two-stage flip-flops $FF_{21}$ and $FF_{22}$ and an edge detection unit 1222 including one-stage flip-flop $FF_{23}$ are prepared. Although not illustrated, a synchronization reset timer for measuring a reset time and the like are also prepared in the synchronization control unit 122. The host controller 11 uses the synchronization address as the slave address, designates the address of the synchronization start timing register 1211 in the second byte after the slave address of the first byte, and broadcasts the write data (0x01 if assigned to 0th bit) in the third byte. Therefore, it is possible to instruct the two audio devices 12 and 13 to start synchronization at the same timing. The synchronization start timing register 1211 outputs, to the synchronization control unit 122, a synchronization start timing signal that toggles from 0 to 1 or from 1 to 0 every time 0x01 is written. Hereinafter, the synchronization start timing signal may be referred to as a synchronization start command.

The synchronization start timing signal is delivered from the I2C slave interface 121 to the synchronization control unit 122 by the synchronization start command. The previous I2C slave interface 121 operates in the SCL clock domain of the I2C bus 14, and the synchronization control unit 122 and the subsequent units operate in the master clock domain. Therefore, asynchronous clock switching is necessary.

Figure 3:
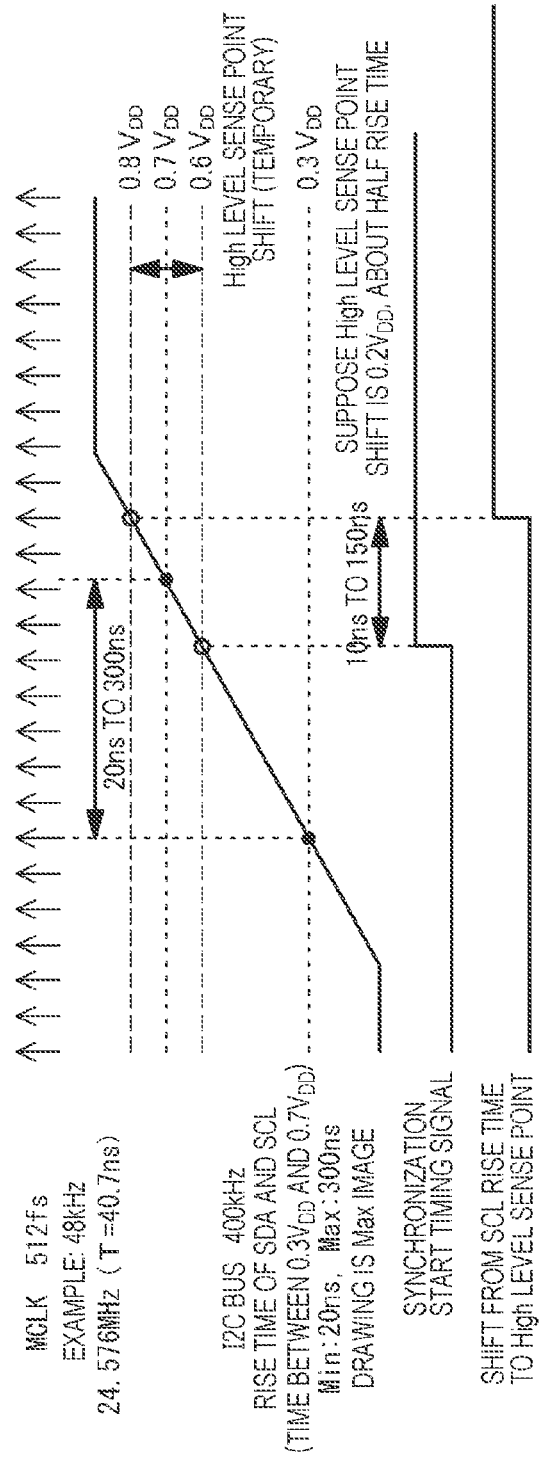
FIG. 3 is a diagram for explaining asynchronous clock switching of synchronization control command.

Asynchronous clock switching of the synchronous control command will be described with reference to FIG. 3. Herein, the master clock MCLK is 24.576 MHz which is 512 times the sampling frequency 48 kHz, and the I2C bus 14 is 400 kHz of Fast-mode as an example.

According to the I2C bus standard, the rise time of the SCL clock is from 20 ns at the minimum to 300 ns at the maximum, and even if the asynchronous switching timings of the two slave devices, that is, the Lch audio device 12 and the Rch audio device 13 are shifted due to the difference in the rise sense points, the SCL clock is four clocks with a period of the master clock MCLK of about 40 ns at about half of the maximum 300 ns. This is 128 $f_s$, which is 128 times the sampling frequency $f_s$, and is the same as the audio signal processing unit 124 to be described later, that performs processing at 128 $f_s$, which is four frequency divisions of the master clock MCLK.

In practice, the rise times of the signal lines SDA and SCL of the I2C bus 14 can be within 100 ns by adjusting the pull-up resistance. Therefore, the synchronization start timing signal is shifted by about 10 ns to 50 ns, and it is estimated that the master clock MCLK is about 1 to 2 clocks after asynchronous switching. Note that the audio signal processing unit 124 performs processing at 128 $f_s$, which is four frequency divisions of the master clock MCLK, and thus can be kept within about half a cycle.

The description returns to the block diagram of FIG. 1.

Synchronization Control Unit

The synchronization control unit 122 starts synchronization reset at a synchronization start timing after asynchronous switching to the master clock MCLK, distributes, to the clock reset control unit 123, a synchronization reset signal for resetting over a preset time, and resets clock generation. Furthermore, in a case where 1 is written to the synchronization start timing register 1211 (Hereinafter, this is referred to as a "synchronization start command"), the synchronization control unit 122 starts asynchronous switching to the master clock MCLK and synchronization reset at the synchronization start timing after edge detection, delivers a synchronization reset signal for releasing the reset after counting a predetermined time by a timer to the clock reset control unit 123, and resets clock generation.

Clock Reset Control Unit

The clock reset control unit 123 generates a clock and a timing signal inside the device in response to the synchronization reset signal generated by the synchronization control unit 122. For example, in a case where the frequency of the master clock MCLK is 512 times (Hereinafter, it is described as "512 $f_s$") the sampling frequency $f_s$ of the audio data, the clock reset control unit 123 generates pulse clocks of frequencies such as 1 $f_s$, 2 $f_s$, 4 $f_s$, and 128 $f_s$. The 128 $f_s$ pulse clock has four phase states, and in order to align these four phase states, the clock reset control unit 123 is configured to generate clocks of all frequencies starting from the synchronization reset release timing.

The clock reset control unit 123 can start a clock at the same time or one clock shift of 128 $f_s$ having four phase states with respect to the master clock MCLK of 512 $f_s$. A one clock shift of 128 $f_s$ is allowed. In a case where a means for monitoring the generated clock and detecting the shift is added and the shift is detected, a synchronization start command is transmitted again to re-establish synchronization.

Audio Signal Processing Unit

An audio signal processing unit 124 includes an analog/digital (A/D) control unit 1241, a digital signal processing unit 1242, and a digital/analog (D/A) control unit 1243 and processes an audio signal in accordance with a clock and a timing signal generated by the clock reset control unit 123.

Specifically, the A/D control unit 1241 performs control to convert an analog audio signal inputted from the outside into digital audio data. The digital signal processing unit 1242 performs predetermined signal processing on the audio data A/D-converted by the A/D control unit 1241 or the audio data directly inputted from the outside. For example, the audio signal processing unit 124 processes the audio data in accordance with the device control address of the I2C bus 14 and register contents such as a volume set by an address for synchronization common to devices. The D/A control unit 1243 performs control to perform D/A conversion on the audio data subjected to the signal processing by the digital signal processing unit 1242 and outputs an analog audio signal to the outside of the device.

Configuration Example of Rch Audio Device

The Rch audio device 13 has the same configuration as the Lch audio device 12. That is, the Rch audio device 13 includes the I2C slave interface 131, the synchronization control unit 132, the clock reset control unit 133, and the audio signal processing unit 134. Furthermore, similarly to the audio signal processing unit 124, the audio signal processing unit 134 also includes an A/D control unit 1341, a digital signal processing unit 1342, and a D/A control unit 1343.

As described above, the Lch audio device 12 and the Rch audio device 13 have the same internal configuration except for having different IDs. In a case where it is desired to set different values between the Lch audio device 12 and the Rch audio device 13, the register is set with the address for device control, and in a case where it is desired to set the same value for Lch and Rch at the same time for block enable, volume, and the like, the same value can be set to the two audio devices 12 and 13 at the same time by setting the register with the address for synchronization.

As described above, in the audio signal synchronization control device 10 according to the first embodiment, broadcast communication is performed using the synchronization address from the host controller 11 to the plurality of audio devices, in this example, the Lch and Rch audio devices 12 and 13. Therefore, the Lch and Rch audio devices 12 and 13 are synchronously reset at the same timing so that the synchronization of the audio data is achieved. Furthermore, not only synchronization reset at an address for synchronization common to devices but also normal register setting can be performed. Therefore, the Lch audio device 12 and the Rch audio device 13 can simultaneously perform volume control.

Therefore, according to the audio signal synchronization control device 10 according to the first embodiment, it is possible to synchronously control the plurality of audio devices while maintaining the existing bus network topology without adding an external interrupt signal for synchronization. Therefore, a monaural audio device can be connected as a plurality of slave devices and can be used in stereo or multichannel.

Procedure of Synchronization Control of First Embodiment

Figure 4:
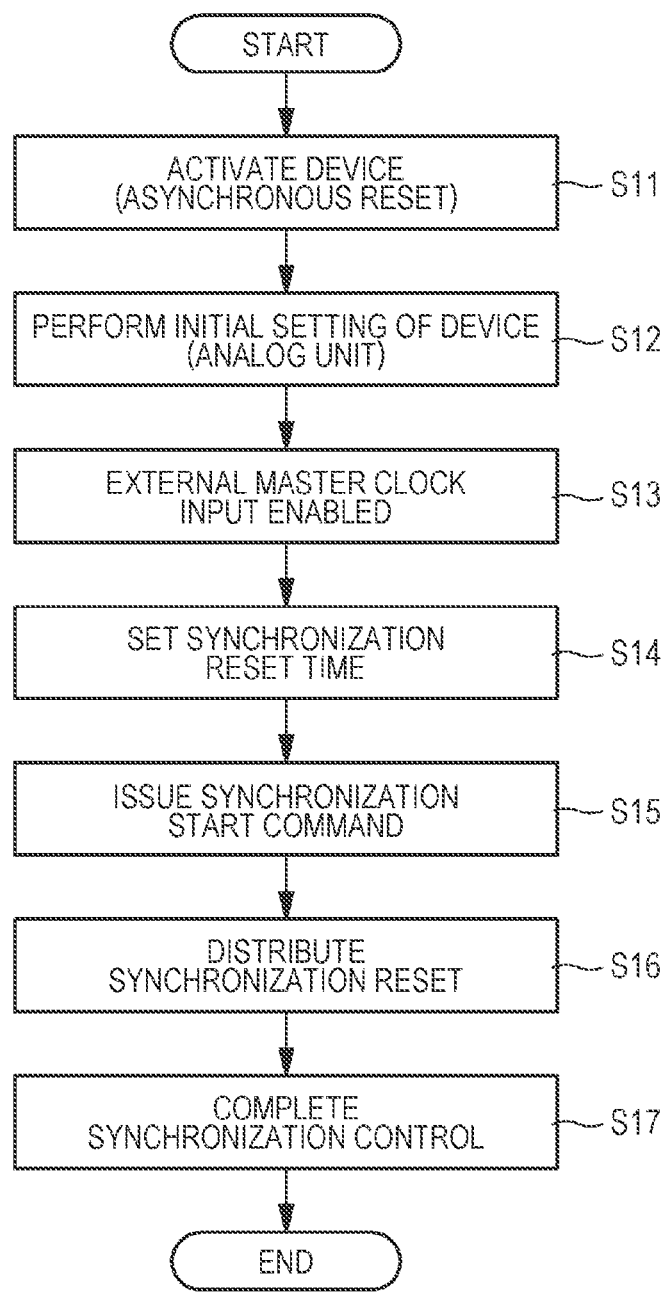
FIG. 4 is a flowchart illustrating an example of a procedure of synchronization control in the audio signal synchronization control device according to the first embodiment.

An example of a procedure of synchronization control in the audio signal synchronization control device 10 according to the first embodiment will be described with reference to a flowchart in FIG. 4. This synchronization control is executed by the synchronization control unit 122 and the synchronization control unit 132 under control by the host controller 11, more specifically, under control by a processor (CPU) constituting the host controller 11.

When the power is turned on, the host controller 11 activates the Lch audio device 12 and the Rch audio device 13 by asynchronous power-on reset (step S11), and then performs initial setting of the analog unit of each of the devices 12 and 13, mainly the analog unit related to the power supply not related to the digital logic (step S12).

Next, the host controller 11 inputs the master clock MCLK generated by the clock oscillator 15 into the Lch audio device 12 with the input of the master clock MCLK enabled (step S13). The oscillation clock of the Lch audio device 12 is inputted into the Rch audio device 13. Therefore, the master clock MCLK having the same source oscillation is inputted into both the Lch audio device 12 and the Rch audio device 13.

However, since the start of the operation of the clock reset circuit is different between the Lch audio device 12 and the Rch audio device 13, the value of the internal counter of the clock reset control units 123 and 133 is different between the Lch audio device 12 and the Rch audio device 13. Therefore, even if the pulse clock is enabled as it is, there is a high possibility that the audio data is processed in the same cycle at shifted phase timing between the Lch audio device 12 and the Rch audio device 13.

Next, the host controller 11 sets a synchronization reset time for the Lch audio device 12 and the Rch audio device 13 (step S14). Specifically, the host controller 11 sets a clock having the longest cycle of the pulse clock, for example, a clock cycle 16 times the cycle of the sampling frequency $f_s$ as the synchronization reset time in the register in advance.

Next, the host controller 11 issues a synchronization start command to the Lch audio device 12 and the Rch audio device 13 at the synchronization address (step S15). With the issuance of the synchronization start command, the synchronization control unit 122 of the Lch audio device 12 and the synchronization control unit 133 of the Rch audio device 13 start synchronization reset at the same timing.

Next, the host controller 11 distributes the synchronization reset to the clock reset control unit 123 and the clock reset control unit 133 over the synchronization reset time set in step S14 (step S16). By this distribution of the synchronization reset, the reset is released at the same timing in the Lch audio device 12 and the Rch audio device 13, the Lch audio device 12 and the Rch audio device 13 are synchronized, and the synchronization control is completed (step S17).

Application Example of First Embodiment

In the first embodiment described above, the case where one address setting pin ADDSEL is provided and different IDs are assigned to two slave devices (i.e., two-channel audio device) has been described as an example, but it is not limited thereto.

Hereinafter, a case where two or more address setting pins ADDSEL are provided and different IDs are assigned to three or more slave devices will be described as an application example of the first embodiment. By providing two or more address setting pins ADDSEL, different IDs can be assigned to audio devices of three or more channels, and different addresses can be assigned to device control addresses for each ID.

Figure 5:
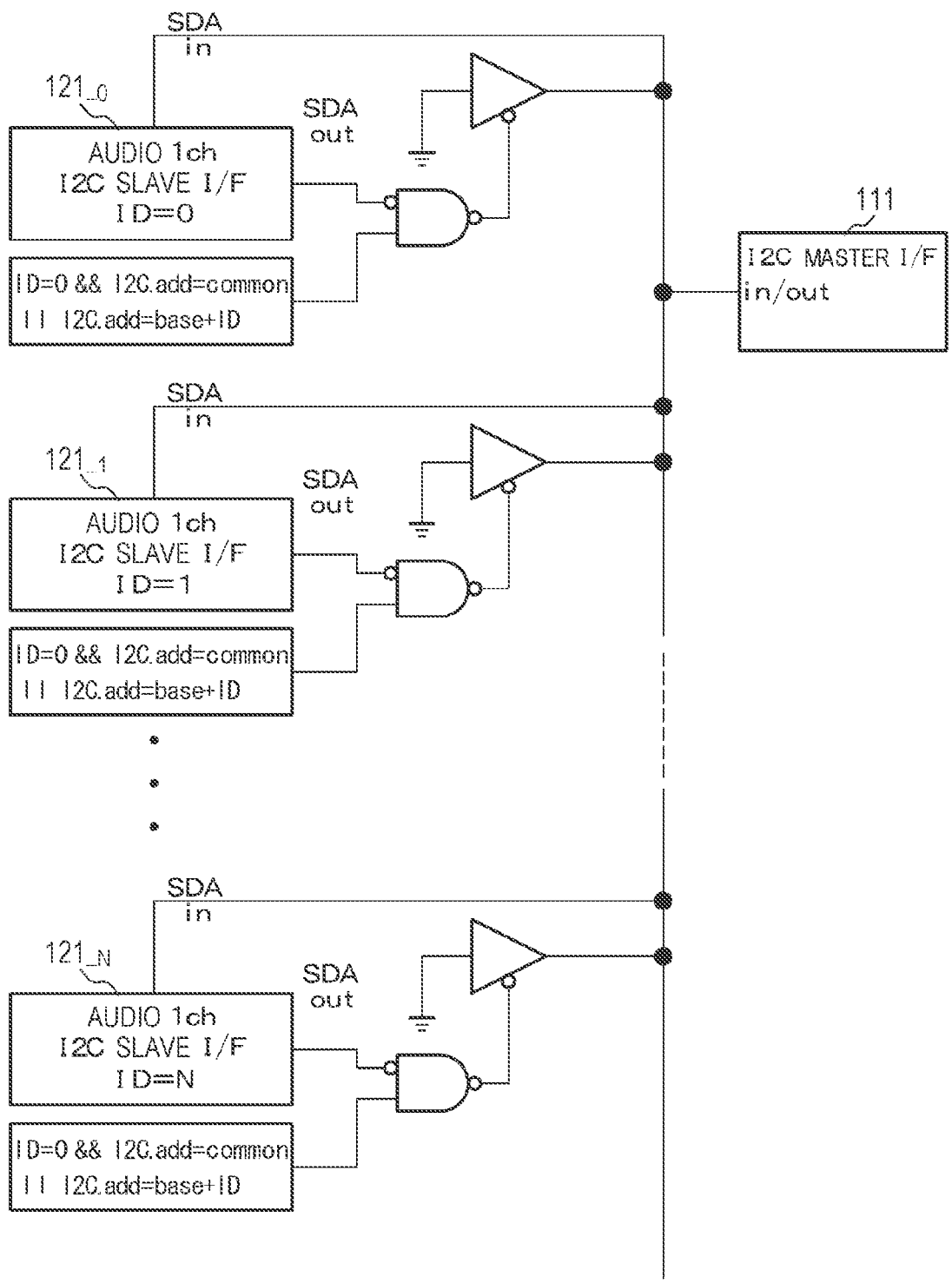
FIG. 5 is a block diagram illustrating a system configuration of an audio signal synchronization control device according to an application example of the first embodiment.

FIG. 5 is a block diagram illustrating a system configuration of an audio signal synchronization control device according to an application example of the first embodiment. Herein, a system configuration is exemplified in which slave interfaces $121_0$ to $121_N$ of the I2C bus standard of N+1 slave devices (i.e., the audio device) are connected to a master interface (I/F) 111 of the I2C bus standard. In a formula (ID=0 & & & I2C.add=common||2C.add=base+ID) described in FIG. 5, || represents a logical OR and means that only the slave device having ID=0 responds when the address is the common address for synchronization among devices.

In the audio signal synchronization control device having the above system configuration, in a case where the slave address corresponding to the ID unique to the slave device is the common address for synchronization among devices (in FIG. 5, common), the SDA out is valid only for the slave device with ID=0, and the SDA out of the slave devices other than ID=0 is invalid. Furthermore, in a case where the slave address is a device control address (in FIG. 5, base+ID) for individually controlling the slave device, SDA out is valid only for the selected slave device.

Second Embodiment

In the audio field, due to high resolution of an audio signal, noise canceling, a wireless communication function, and the like, there is a high demand for a digital signal processing unit to use the most advanced process for high integration, an operation frequency, and low power consumption, which can incorporate a processor. On the other hand, the analog unit such as the A/D control unit or the D/A control unit may be configured by another device or another chip (in the same package) since there is a high demand for an old process having a track record in terms of low noise and cost.

In order to be able to cope with such a configuration, in the second embodiment of the present disclosure, synchronization control of a plurality of audio devices is realized by adding a synchronization timing signal (hereinafter, referred to as a "synchronization start timing signal SYNC") for stable data communication with a device having a host interface different from the I2C bus and a fine adjustment function of a synchronization start timing.

That is, the second embodiment of the present disclosure is an example of implementing synchronization control in a system configuration in which an audio signal processing unit is separated into a monaural multi-channel analog circuit unit and a stereo digital circuit unit. Note that the analog circuit unit is mainly constituted by an analog circuit unit, and a digital logic unit is mounted on the analog circuit unit by an interface (I/F) or the like.

[System Configuration]

Figure 6:
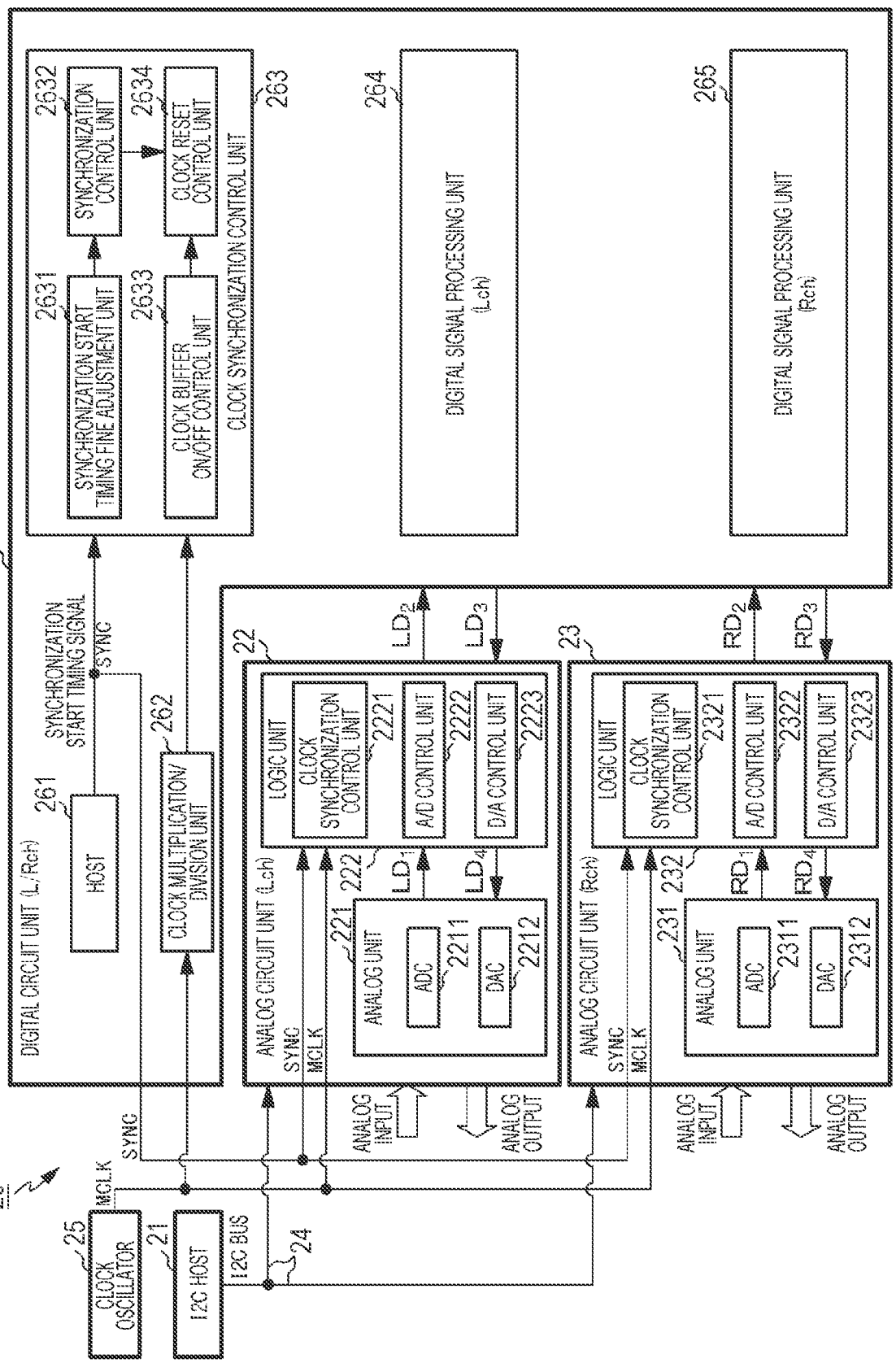
FIG. 6 is a block diagram illustrating a system configuration of an audio signal synchronization control device according to a second embodiment of the present disclosure.

FIG. 6 illustrates a block diagram of a system configuration of an audio signal synchronization control device according to the second embodiment. Herein, the case of two channels of Lch and Rch is exemplified as the plurality of channels, but the plurality of channels is not limited to two channels of Lch and Rch, and may be three or more channels.

The audio signal synchronization control device 20 according to the second embodiment includes a host controller 21 of the I2C bus standard, monaural analog circuit units 22 and 23 of Lch and Rch, a clock oscillator 25, and a stereo digital circuit unit 26. In other words, the audio signal synchronization control device 20 according to the second embodiment has a configuration in which the audio signal processing unit is separated into the monaural analog circuit units 22 and 23 and the stereo digital circuit unit 26. Then, the host controller 21 of the I2C bus standard and the analog circuit units 22 and 23 of Lch and Rch are connected by the I2C bus 24.

The clock oscillator 25 generates clocks of the same source oscillation for the analog circuit units 22 and 23 of Lch and Rch and the stereo digital circuit unit 26, and supplies the clocks as the master clock MCLK to the analog circuit units 22 and 23 of Lch and Rch and the stereo digital circuit unit 26. The master clock MCLK is, for example, a clock having a frequency of 32 MHz.

Configuration Example of Digital Circuit Unit

The digital circuit unit 26 has a host controller 261, a clock multiplication/division unit 262, a clock synchronization control unit 263, an Lch digital signal processing unit 264, and an Rch digital signal processing unit 265.

Host Controller

The host controller 261 for digital (hereinafter, simply referred to as "host controller 261") built in the digital circuit unit 26 is a host controller having an interface different from that of the I2C bus 24. Therefore, as in the case of the first embodiment, the digital circuit unit 26 incorporating the host controller 261 cannot perform synchronization by issuing a command of the synchronization start timing of broadcast communication via the I2C bus. As the host controller 261, for example, an ARM CPU or the like connected by an AMBA bus of ARM company can be exemplified.

The host controller 261 outputs, to clock synchronization control unit 263, a synchronization start timing signal SYNC for performing synchronization control by issuing a synchronization start command by writing to a built-in synchronization start control register (not illustrated). The synchronization start timing signal SYNC is a signal of a rising edge synchronized with the master clock MCLK, is also outputted to the outside of the digital circuit unit 26, and is supplied to the Lch analog circuit unit 22 and the Rch analog circuit unit 23.

The synchronization start timing signal SYNC is a dedicated signal that transmits the synchronization start timing to the analog circuit units of the plurality of channels starting from the digital circuit unit. Since the synchronization start timing signal SYNC is an external signal between devices, it is necessary to consider that there is a possibility that a long delay or glitch due to an I/O pin or wiring is added unlike a delay inside the device that can be estimated at the time of device synthesis.

Note that, in the present example, the host controller 261 is built in the digital circuit unit 26, but is not limited to the configuration built in the digital circuit unit 26. However, from the viewpoint of downsizing the entire system, a configuration in which the host controller 261 is incorporated is more preferable than a configuration in which the host controller is provided outside the digital circuit unit 26.

Clock Multiplication/Division Unit

The clock multiplication/division unit 262 includes, for example, a phase locked loop (PLL) circuit and can operate the host controller 261 at a high frequency. However, even if the multiplied clock is frequency-divided and matched to the same frequency as the analog circuit units 22 and 23, the phase is not aligned with the analog circuit unit 22 and the analog circuit unit 23, which are other circuit units, and thus a mechanism for adjusting the phase is necessary.

Clock Synchronization Control Unit

The clock synchronization control unit 263 has a synchronization start timing fine adjustment unit 2631, a synchronization control unit 2632, a clock buffer ON/OFF control unit 2633, and a clock reset control unit 2634, and performs synchronization control on the basis of a synchronization start timing signal SYNC given from the host controller 261.

The synchronization start timing fine adjustment unit 2631 can delay the synchronization start timing to be transmitted to the synchronization control unit 2632 from the command issue timing in units of the master clock MCLK (In this example, the frequency is 32 MHz, and the cycle is 31.25 ns). The synchronization start timing fine adjustment unit 2631 generates a toggle signal indicating a start timing of a synchronization reset signal (pulse) and supplies the toggle signal to the synchronization control unit 2632.

The synchronization control unit 2632 receives the toggle signal from the synchronization start timing fine adjustment unit 2631, generates a synchronization reset signal, and supplies the synchronization reset signal to the clock reset control unit 2634. The master clock MCLK that has passed through the clock multiplication/division unit 262 is supplied to the clock reset control unit 2634 through the clock buffer ON/OFF control unit 2633.

The clock buffer ON/OFF control unit 2633 is a circuit unit also referred to as a clock enabler, and is a clock buffer having a function of stopping the supply of the master clock MCLK in a case where audio signal processing is unnecessary. By selectively stopping the supply of the master clock MCLK by the function of this clock buffer, it is possible to achieve low power consumption.

The clock reset control unit 2634 generates a clock and a reset signal to be supplied to the Lch digital signal processing unit 264 and the Rch digital signal processing unit 265, which process audio signals. Although not illustrated in FIG. 6, the clock reset control unit 2634 supplies the digital signal processing units 264 and 265 with, for example, a pulse clock obtained by thinning 32 MHz of the master clock MCLK, that is, 512 $f_s$ which is 512 times the sampling frequency $f_s$ (=62.5 kHz) to a cycle of 8 MHz which is ¼.

The clock reset control unit 2634 performs synchronization reset over a period set in advance by a register (not illustrated), and starts generation of all clocks including the frequency-divided pulse clock from synchronization reset cancellation. A synchronization reset signal is supplied from the synchronization control unit 2632 to the clock reset control unit 2634. The configurations of the synchronization control unit 2632 and the clock reset control unit 2634 are basically similar to the configurations of the synchronization control unit 122 and the clock reset control unit 123 of the first embodiment.

In response to the synchronization control command from the host controller 261, the digital circuit unit 26 can perform synchronization reset over a period designated in advance by the synchronization start timing fine adjustment unit 2631, the synchronization control unit 2632, and the clock reset control unit 2634 of the clock synchronization control unit 263, and can perform all clock generation again with the reset release timing as a starting point. The present embodiment is different from the first embodiment in that the synchronization start timing can be finely adjusted by the synchronization start timing fine adjustment unit 2631.

Configuration Example of Lch Analog Circuit Unit

In the second embodiment, since the synchronization control is performed by the synchronization start timing signal SYNC outputted from the host controller 261, it is unnecessary for the Lch analog circuit unit 22 to have the special I2C slave interface 121 that decodes the command of the slave address for synchronization in the first embodiment. However, although not shown in FIG. 6, a normal I2C slave interface is required.

In the Lch analog circuit unit 22, synchronization control is performed specifically by detecting a rising edge of the synchronization start timing signal SYNC in synchronization with the synchronization start timing signal SYNC given from the digital circuit unit 26. The synchronization start timing signal SYNC is a signal outputted by a synchronization control command in the digital circuit unit 26.

The Lch analog circuit unit 22 includes a logic unit 222 in addition to the analog unit 221. The analog unit 221 includes an analog circuit of an analog-digital converter (ADC) 2211 and a digital-analog converter (DAC) 2212 which process an audio signal. The Lch analog audio signal is inputted into the ADC 2211, and the Lch analog audio signal is outputted from the DAC 2212.

The logic unit 222 includes a clock synchronization control unit 2221, an A/D control unit 2222, and a D/A control unit 2223. In FIG. 6, the internal configuration of the clock synchronization control unit 2221 is not illustrated in detail, but basically has the same configuration as the clock synchronization control unit 263 of the digital circuit unit 26. That is, the clock synchronization control unit 2221 includes a synchronization start timing fine adjustment unit, a synchronization control unit, a clock buffer ON/OFF control unit, and a clock reset control unit therein, and can perform synchronization reset and perform all clock generation again with the reset release timing as a starting point.

Configuration Example of Rch Analog Circuit Unit

Similarly to the Lch analog circuit unit 22, it is unnecessary for the Rch analog circuit unit 23 to have the special I2C slave interface 131 that decodes the command of the slave address for synchronization in the first embodiment, but a normal I2C slave interface is necessary. Similarly to the Lch analog circuit unit 22, the Rch analog circuit unit 23 also detects the rising edge of the synchronization start timing signal SYNC given from the digital circuit unit 26 and performs synchronization control.

The Rch analog circuit unit 23 has the configuration similar to that of the Lch analog circuit unit 22. That is, the Rch analog circuit unit 23 incorporates the logic unit 232 in addition to the analog unit 231. Then, the analog unit 231 includes an analog circuit of the ADC 2311 and the DAC 2312, and the logic unit 232 includes a clock synchronization control unit 2321, an A/D control unit 2322, and a D/A control unit 2323. Similarly to the clock synchronization control unit 263 of the digital circuit unit 26, the clock synchronization control unit 2321 includes a synchronization start timing fine adjustment unit, a synchronization control unit, a clock buffer ON/OFF control unit, and a clock reset control unit therein, and can perform synchronization reset and perform all clock generation again with the reset release timing as a starting point.

[Fine Adjustment of Synchronization Start Timing]

In the audio signal synchronization control device 20 according to the second embodiment having the above configuration, the delay amounts of the synchronization start timing fine adjustment unit 2631 in the digital circuit unit 26 and the synchronization start timing fine adjustment units (not illustrated) in the Lch and Rch analog circuit units 22 and 23 can be adjusted. Then, by adjusting the delay amounts, data communication between devices can be stabilized, and synchronization control of Lch and Rch audio data can be performed.

For example, in a system in which the frequency of the sampling clock of the audio data is 62.5 kHz (cycle: 16 μs) and the frequency of the master clock MCLK is 32 MHz (cycle: 31.25 ns) that is 512 times the sampling frequency $f_s$, processing is performed with 128 $f_s$ (cycle: 125 ns) that is ¼ of the master clock MCLK. It is important that there is no shift of the sampling period or more in the plurality of channels (in this example, two channels of Lch and Rch) of the analog circuit unit, and that the setup-hold condition is satisfied between the analog circuit units 22 and 23 and the digital circuit unit 26 to stably perform communication.

The fine adjustment of the synchronization start timing will be specifically described below with reference to the timing diagram of FIG. 7. In the timing diagram of FIG. 7, the timing of issuing the synchronization start command and outputting the synchronization start timing signal SYNC of the digital circuit unit 26 are illustrated in the upper part of the one-dot chain line, and the timing of fine adjustment of the synchronization start timing from the input of the synchronization start timing signal SYNC of the Lch and Rch analog circuit units 22 and 23 is illustrated in the lower part of the one-dot chain line.

In the digital circuit unit 26, the synchronization start timing signal SYNC to which a small delay is added by the clock buffer is inputted into the logic units 222 and 232 of the analog circuit units 22 and 23 with respect to the synchronization start timing signal SYNC to which a delay is added by the PLL circuit or the like of the clock multiplication/division unit 262. The frequency of the master clock MCLK that generates the synchronization start timing signal SYNC is set to 32 MHz (cycle: 31.25 ns) as an example.

Herein, the synchronization start timing signal SYNC in the digital circuit unit 26 and the analog circuit units 22 and 23 is SYNC (create), and numbers (1), (2), (3), and so forth indicating phases are assigned to the rising and falling edges. Suppose that the clock frequency of the audio signal processing is 8 MHz, which is ¼ of the master clock MCLK, and there are four rising phases of the clock: (1), (3), (5), and (7).

A rising edge signal of a synchronization start command is inputted from the host controller 261 of the digital circuit unit 26. The digital circuit unit 26 latches a three-stage flip-flop (three-stage F/F) by edge detection and asynchronous switching by a two-stage flip-flop. At the same time, the timing signal of the synchronization start command is outputted to the analog circuit units 22 and 23 as a synchronization start timing signal SYNC.

The analog circuit units 22 and 23 latch the three-stage flip-flop (three-stage F/F) for edge detection and asynchronous switching with respect to the asynchronous synchronization start timing signal SYNC. The synchronization start command of the digital circuit unit 26 is three-stage flip-flop that is the same as the analog circuit units 22 and 23 from the viewpoint of circuit utilization although asynchronous switching is unnecessary for MCLK synchronization.

For example, when the fine adjustment value SYNC_FINE_DELAY is 0 (FINE_DELAY=0 is illustrated), the digital circuit unit 26 sets the synchronization start timing to the phase (7) of the synchronization start timing signal SYNC (create). Although the synchronization reset section is omitted for the sake of simplicity, since the synchronization reset time is a unit of a frequency of ¼ of the master clock MCLK which is the audio signal processing clock, the phases of the clock at the reset release timing are the same phase (7).

In the analog circuit units 22 and 23, a difference due to a wiring delay of the synchronization start timing signal SYNC is illustrated. In this example, the fine adjustment value SYNC_FINE_DELAY of Lch at which the synchronization start timing signal SYNC arrives late is set to 1, the fine adjustment value SYNC_FINE_DELAY of Rch is set to 2, and the phase of the clock of the audio signal processing is set to the phase (3).

The fine adjustment function of this synchronization start timing enables fine adjustment of the phase shift between Lch and Rch in units of cycles of the master clock MCLK that generates the synchronization start timing signal SYNC. The audio data changes once every four cycles of the master clock MCLK, and a shift of about 1 or 2 clocks of the synchronization start timing signal SYNC is allowable.

In the analog circuit units 22 and 23, the data is changed by the clock of the phase (3), but there is a delay variation depending on each device or the state of the device, and thus there is an unstable portion of the data as illustrated by hatching in the drawing. Since the phase of the audio signal processing clock of the digital circuit unit 26 that receives this signal is phase (7), the audio signal processed by the logic units 222 and 232 of the analog circuit units 22 and 23 can be received at a stable timing. Moreover, since the phase of the audio signal processing clock of the digital circuit unit 26 is phase (7), an unstable portion due to delay variation of the data signal outputted from the digital circuit unit 26 is in the vicinity of (7). Since the phase of the clock received by the logic units 222 and 232 of the analog circuit units 22 and 23 that receive this signal is phase (3), it can be received at a stable timing.

Figure 7:
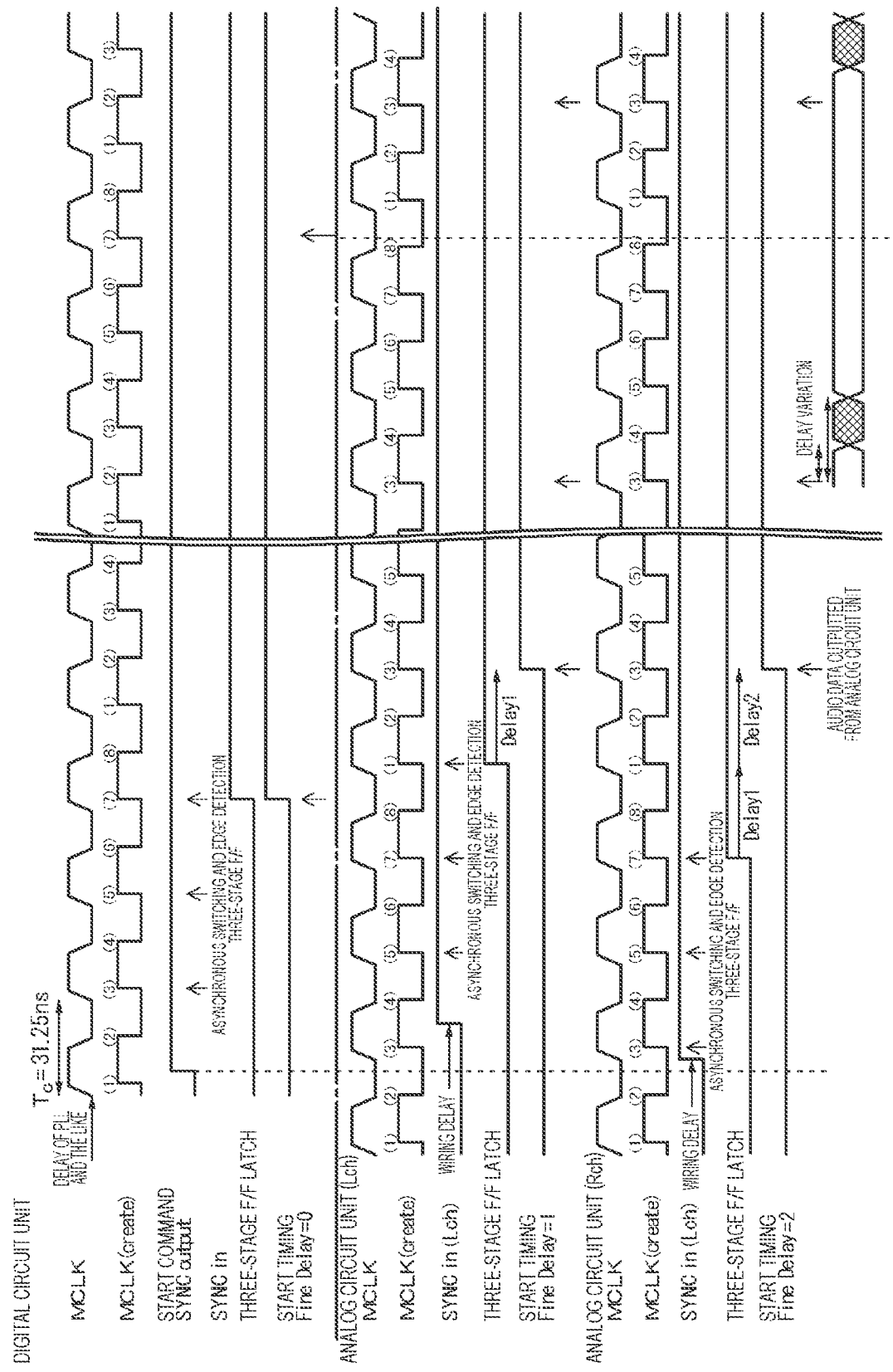
FIG. 7 is a timing diagram for explaining fine adjustment of the synchronization start timing in the audio signal synchronization control device according to the second embodiment.

In the timing diagram in FIG. 7, Deley 1 is a fine adjustment amount on the Lch analog circuit unit 22 side, and Deley 1+Deley 2 are fine adjustment amounts of the Rch analog circuit unit 23.

[Flow of Audio Signal Processing]

Next, a flow of audio signal processing in the audio signal synchronization control device 20 according to the second embodiment having the above configuration will be described. Note that, although the second embodiment exemplifies a case where there are two monaural analog circuit units, the monaural analog circuit unit may have a multichannel configuration including three or more monaural analog circuit units.

The analog audio signal of Lch is inputted into the Lch analog circuit unit 22, and the analog audio signal of Rch is inputted into the Rch analog circuit unit 23. The analog audio signal of Lch is converted into a digital signal by the ADC 2211 of the analog unit 221. The digital audio signal $LD_1$ outputted from the ADC 2211 is supplied to the A/D control unit 2222 of the logic unit 222. The A/D control unit 2222 controls the ADC 2211 of the analog unit 221, converts the signal into a digital audio signal $LD_2$ for the Lch digital signal processing unit 264 of the digital circuit unit 26, and supplies the digital audio signal $LD_2$ to the Lch digital signal processing unit 264.

In the Lch digital signal processing unit 264, signal processing such as volume adjustment is performed on the digital audio signal $LD_2$, and the digital audio signal $LD_2$ is outputted as a digital audio signal $LD_3$. The digital audio signal $LD_3$ is supplied to the analog circuit unit 22 again, passes through the D/A control unit 2223 of the logic unit 222, and is supplied to the DAC 2212 as the digital audio signal $LD_4$ for the DAC 2212 of the analog unit 221. Then, the DAC 2212 converts the digital audio signal $LD_4$ into an analog signal and outputs the analog signal as an Lch analog audio signal.

Similarly, the analog audio signal of Rch is converted into a digital signal by the ADC 2311 of the analog unit 231. The digital audio signal $RD_1$ outputted from the ADC 2311 is supplied to the A/D control unit 2322 of the logic unit 232. The A/D control unit 2322 controls the ADC 2311 of the analog unit 231, converts the signal into a digital audio signal $RD_2$ for the Rch digital signal processing unit 265 of the digital circuit unit 26, and supplies the digital audio signal $RD_2$ to the Rch digital signal processing unit 265.

In the Rch digital signal processing unit 265, signal processing such as volume adjustment is performed on the digital audio signal $RD_2$, and the digital audio signal $RD_2$ is outputted as the digital audio signal $RD_3$. The digital audio signal $RD_3$ is supplied to the analog circuit unit 23 again, passes through the D/A control unit 2323 of the logic unit 232, and is supplied to the DAC 2312 as the digital audio signal $RD_4$ for the DAC 2312 of the analog unit 231. Then, the DAC 2312 converts the digital audio signal $RD_4$ into an analog signal and outputs the analog signal as an Rch analog audio signal.

Procedure of Synchronization Control of Second Embodiment

Figure 8:
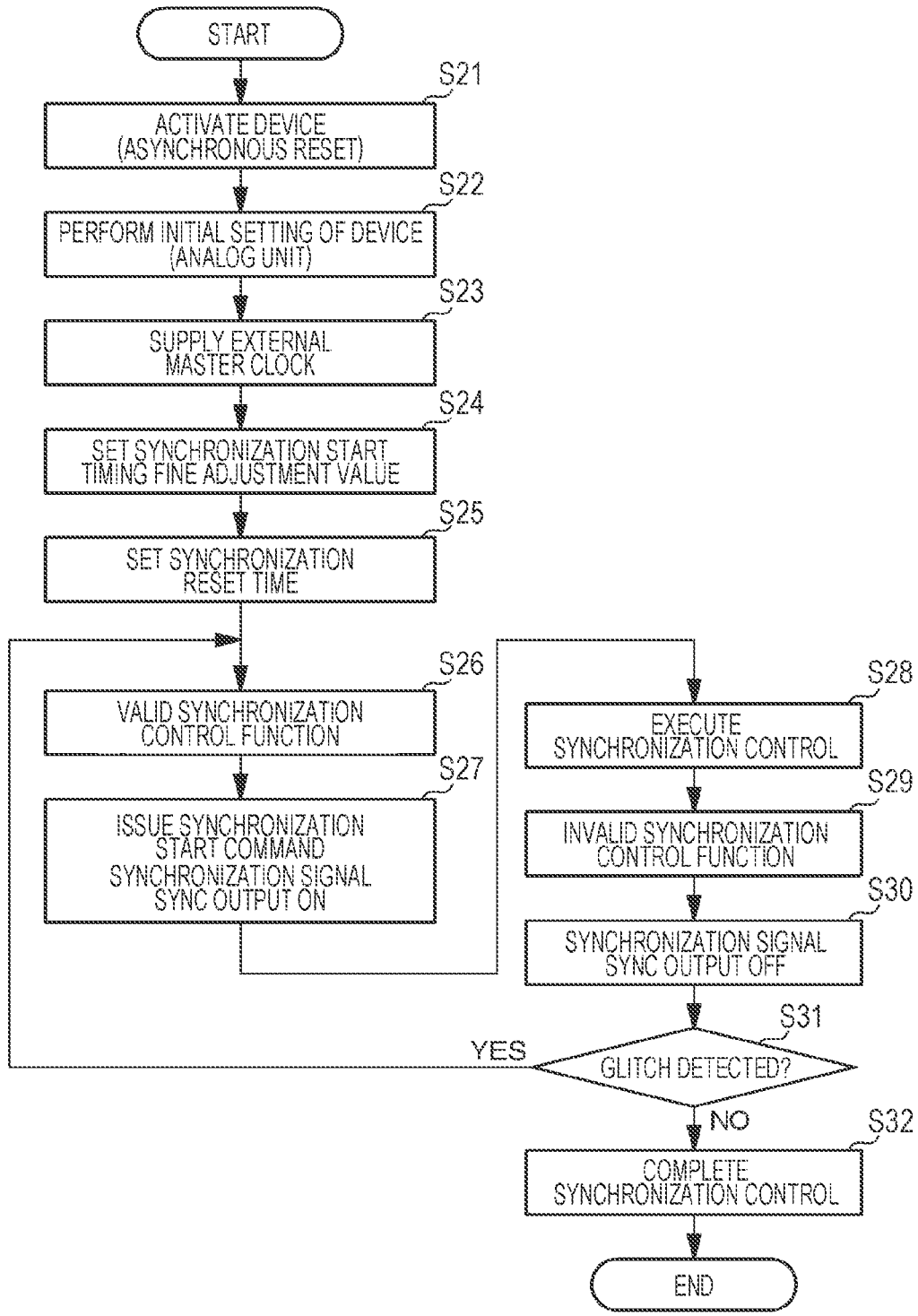
FIG. 8 is a flowchart illustrating an example of a procedure of synchronization control in the audio signal synchronization control device according to the second embodiment.

An example of a procedure of synchronization control in the audio signal synchronization control device 20 according to the second embodiment will be described with reference to a flowchart of FIG. 8. This synchronization control is basically executed under the control of the host controller 261 in the digital circuit unit 26, more specifically, under the control of a processor (CPU) constituting the host controller 261.

Furthermore, the register setting is set by the internal CPU in the digital circuit unit 26 and is set by the host controller 21 of the I2C bus standard via the I2C bus 24 in the analog circuit units 22 and 23.

When the power is turned on, the host controller 261 activates the Lch analog circuit unit 22, the Rch analog circuit unit 23, and the digital circuit unit 26 by asynchronous power-on reset (step S21), and then performs initial setting of the analog units 221 and 231 of the analog circuit units 22 and 23 (step S22).

Next, the host controller 261 controls the clock multiplication/division unit 262 in the digital circuit unit 26 and the clock buffer ON/OFF control unit 2633 of the clock synchronization control unit 263 to cause the clock reset control unit 2634 to supply the external master clock MCLK from the clock oscillator 25 (step S23). At this time, the analog circuit units 22 and 23 similarly supply the external master clock MCLK to the clock synchronization control units 2221 and 2321 in the logic unit 222 and 232.

Next, the host controller 261 sets a fine adjustment value SYNC_FIN_DELAY of the synchronization start timing fine adjustment unit 2631 in the clock synchronization control unit 263 of the digital circuit unit 26, and the host controller 21 of the I2C bus standard sets a fine adjustment value SYNC_FINE_DELAY of a synchronization start timing fine adjustment unit (not illustrated) in the clock synchronization control units 2221 and 2321 of the analog circuit units 22 and 23 (step S24). By setting the fine adjustment value SYNC_FINE_DELAY, the input synchronization start timing can be delayed in units of the master clock MCLK (In this example, 512 $f_s$=32 MHz). In both the cases, only the delay is set. However, in a case where it is desired to make the timing of the analog circuit units 22 and 23 earlier than that of the digital circuit unit 26, the digital circuit unit 26 can be set relatively earlier by setting a larger value than that of the analog circuit units 22 and 23.

Next, the host controller 261 sets the pulse width of the synchronization reset signal generated by the synchronization control unit 2632 in the clock synchronization control unit 263 of the digital circuit unit 26, that is, the synchronization reset time (step S25). At this time, the longest cycle of the pulse clock generated by the clock reset control unit 2634, for example, a cycle 16 times the cycle of the sampling frequency $f_s$ is set as the synchronization reset time in the register in advance. Similarly, the synchronization reset time of the clock synchronization control units 2221 and 2321 of the analog circuit units 22 and 23 is set by the host controller 21 of the I2C bus standard.

Next, for the host controller 261 and the analog circuit units 22 and 23, the host controller 21 of the I2C bus standard makes the synchronization control function (SYNC_EN=1) valid by register setting (step S26). By making the synchronization control function valid, the state machines of the synchronization start timing fine adjustment unit 2631 in the clock synchronization control unit 263 of the digital circuit unit 26 and the synchronization start timing fine adjustment units (not illustrated) in the clock synchronization control units 2221 and 2321 of the analog circuit units 22 and 23 enter a synchronization start command standby state.

Next, at the same time as issuing the synchronization start command, the host controller 261 outputs a synchronization start timing signal SYNC (rising edge of 0→1) to the clock synchronization control unit 263 and the analog circuit units 22 and 23 (step S27). At this time, the state machines of the synchronization start timing fine adjustment unit 2631 in the clock synchronization control unit 263 of the digital circuit unit 26 and the synchronization start timing fine adjustment units (not illustrated) in the clock synchronization control units 2221 and 2321 of the analog circuit units 22 and 23 are in the state of delay control of the synchronization start timing signal SYNC.

Then, the above-described state machine delays the synchronization start timing by the fine adjustment value SYNC_FINE_DELAY set in step S24 under the control of the host controller 261, and then generates a toggle signal and supplies the toggle signal to the synchronization control unit 2632 (step S28). The toggle signal is a signal indicating the start timing of the synchronization reset signal.

In the processing of step S28, a synchronization reset signal having a time width of the synchronization reset time set in step S25, that is, a long pulse in which the low level continues over the reset period is generated. The clock reset control unit 2634 starts generation of all the pulse clocks starting from the reset release timing. At this time, the state machines are in a state of checking the presence or absence of glitch (the short Low level of the synchronization start timing signal SYNC) while the synchronization control function in step S26 is valid. The synchronization start timing signal SYNC needs to be changed to 1 by a toggle signal of 0→1 indicating the start timing, and then 1 must continue. In a case where the level drops to the low level due to external noise or the like, notification of an error is provided as an abnormal synchronization start timing signal.

Next, the host controller 261 makes the synchronization control function invalid by register setting (SYNC_EN=0) (step S29). The synchronization control function of the analog circuit units 22 and 23 is made invalid by the host controller 21 of the I2C bus standard.

Next, the host controller 261 sets the synchronization control register in the digital circuit unit 26 and sets the synchronization start timing signal SYNC from 1 to 0, that is, turns off the output of the synchronization start timing signal SYNC (step S30).

Next, the host controller 21 of the I2C bus standard determines whether or not glitch is detected (step S31), and in a case where glitch is detected from register notification (YES in S31), the process returns to step S27 to retry synchronization control. As described above, when glitch occurs, retry is performed for synchronization control, and thus it is possible to avoid synchronization malfunction due to glitch occurrence.

Note that, herein, retry is performed for synchronization control when glitch occurs. However, with respect to the synchronization start timing signal SYNC, it is possible to suppress the occurrence of glitch by changing the toggle (both edges) validity of the first embodiment to the validity of only the rising edge and limiting the input reception period in the second embodiment affected by external noise.

In a case where the glitch is not detected (NO in S31), the host controller 261 and the host controller 21 of I2C bus standard assume that the Lch analog circuit unit 22, the Rch analog circuit unit 23, and the digital circuit unit 26 are synchronized, and complete the synchronization control (step S32).

Third Embodiment

Figure 9:
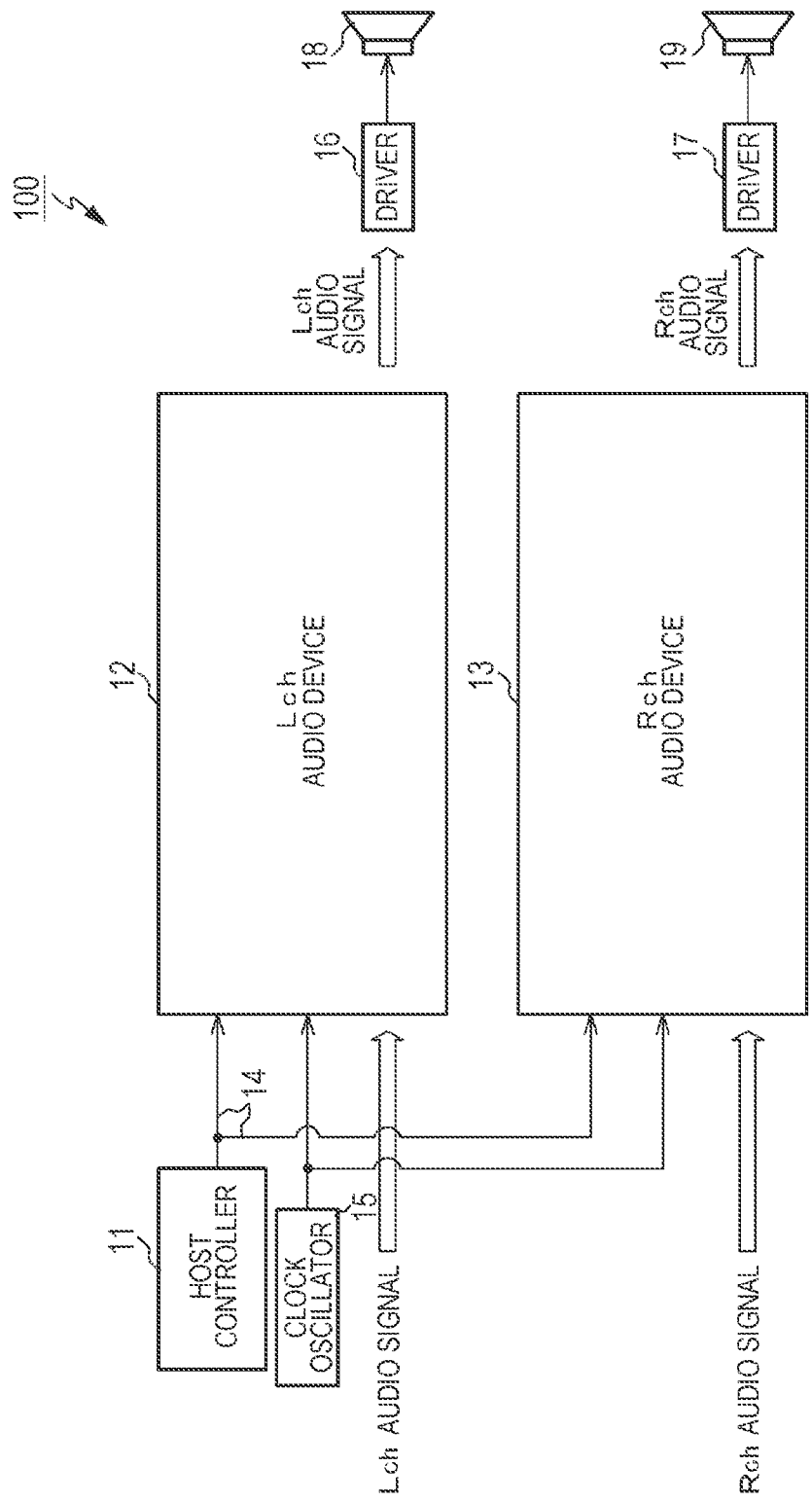
FIG. 9 is a block diagram illustrating a system configuration of an audio device according to a third embodiment of the present disclosure.

A third embodiment of the present disclosure is an example of an audio device. FIG. 9 is a block diagram of a system configuration of an audio device according to a third embodiment. Examples of the audio device according to the third embodiment include a headphone device and a speaker device.

An audio device 100 according to the present embodiment includes a host controller 11, Lch and Rch audio devices 12 and 13, a clock oscillator 15, speaker drivers 16 and 17, and speakers 18 and 19. Then, the host controller 11 and the Lch and Rch audio devices 12 and 13 are connected by an I2C bus 14.

In the audio device 100 according to the third embodiment of the system configuration described above, as the host controller 11, the Lch and Rch audio devices 12 and 13, and the clock oscillator 15, the host controller 11 of the audio signal synchronization control device 10, the Lch and Rch audio devices 12 and 13, and the clock oscillator 15 according to the first embodiment can be used. Note that, although the audio signal synchronization control device 10 according to the first embodiment is applied to the audio device 100 according to the third embodiment herein, the audio signal synchronization control device 20 according to the second embodiment may be applied.

<Configuration that can be Adopted by Present Disclosure>

Note that, the present technology can also adopt the following configurations.

<<A. Audio Signal Synchronization Control Device>>

[A-1] An audio signal synchronization control device, including:
a host controller;
a plurality of audio devices;
a communication unit capable of performing broadcast communication, having a device control address separately set for the plurality of the audio devices and a synchronization address common to the devices, and configured to control the plurality of the audio devices from the host controller; and
a clock oscillator that supplies a clock of a same source oscillation to the plurality of audio devices as a master clock,
in which the host controller performs broadcast communication with the plurality of the audio devices using the synchronization address, and
each of the plurality of the audio devices includes:
a synchronization control unit that generates a synchronization reset signal in a case where the broadcast communication is performed with the synchronization address;
a clock reset control unit that generates a timing signal in response to the synchronization reset signal generated by the synchronization control unit; and
an audio signal processing unit that processes audio data in accordance with the timing signal generated by the clock reset control unit.

[A-2] The audio signal synchronization control device according to [A-1],
in which the communication unit is a bus topology capable of broadcast communication.

[A-3] The audio signal synchronization control device according to [A-2],
in which the communication unit is an I2C bus.

[A-4] The audio signal synchronization control device according to [A-3],
in which, in a case where the plurality of the audio devices receives the broadcast communication command at the synchronization address common to the devices, the plurality of the devices simultaneously accepts the broadcast communication command, and only a predetermined audio device based on identification information on the device performs ACK response.

[A-5] The audio signal synchronization control device according to [A-3],
in which, in a case where the plurality of the audio devices receives the broadcast communication command at the device control address, only a selected audio device responds.

[A-6] The audio signal synchronization control device according to any one of [A-1] to [A-5],
in which the synchronization control unit starts synchronization reset and releases the reset after a lapse of a predetermined time in a case where broadcast communication is performed using the synchronization address.

[A-7] The audio signal synchronization control device according to any one of [A-1] to [A-6],
in which the clock reset control unit generates pulse clocks having frequencies of 1 $f_s$, 2 $f_s$, 4 $f_s$, and 128 $f_s$ in a case where a frequency of the master clock is 512 times a sampling frequency $f_s$ of the audio data.

[A-8] The audio signal synchronization control device according to any one of [A-1] to [A-7],
in which the audio signal processing unit processes the audio data in accordance with register contents set by the device control address and the synchronization address.

[A-9] The audio signal synchronization control device according to any one of [A-1] to [A-8],
in which the audio signal processing unit includes a monaural multi-channel analog circuit unit and a stereo digital circuit unit.

[A-10] The audio signal synchronization control device according to [A-9],
in which the host controller and the multi-channel analog circuit unit are connected by an I2C bus.

[A-11] The audio signal synchronization control device according to [A-10],
in which the digital circuit unit incorporates a digital controller, and
the digital controller is a host controller of an interface different from the I2C bus.

[A-12] The audio signal synchronization control device according to [A-11],
in which the digital circuit unit has a clock synchronization control unit configured to perform synchronization control, and
the digital controller supplies a synchronization start timing signal for performing synchronization control to the clock synchronization control unit.

[A-13] The audio signal synchronization control device according to [A-12],
in which the synchronization start timing signal is a signal that transmits a synchronization start timing to the multi-channel analog circuit unit starting from the digital circuit unit.

[A-14] The audio signal synchronization control device according to [A-12] or [A-13],
in which the clock synchronization control unit performs synchronization control on the basis of the synchronization start timing signal given from the digital controller.

[A-15] The audio signal synchronization control device according to [A-12] or [A-13],
in which the clock synchronization control unit has a synchronization start timing fine adjustment unit capable of delaying the synchronization start timing to be transmitted to the synchronization control unit from a command issuance timing in unit of master clock.

[A-16] The audio signal synchronization control device according to [A-15],
in which the synchronization start timing fine adjustment unit generates a toggle signal indicating a start timing of the synchronization reset signal and supplies the toggle signal to the synchronization control unit.

[A-17] The audio signal synchronization control device according to [A-16],
in which the synchronization control unit receives the toggle signal from the synchronization start timing fine adjustment unit, generates a synchronization reset signal, and supplies the synchronization reset signal to the clock reset control unit.

[A-18] The audio signal synchronization control device according to [A-17],
in which the clock reset control unit performs synchronization reset over a preset period and starts generation of a clock from synchronization reset release.

[A-19] The audio signal synchronization control device according to any one of [A-12] to [A-18],
in which the digital circuit unit receives a synchronization control command from the digital controller, performs synchronization reset over a period designated in advance, and can perform clock generation again with a reset release timing as a starting point.

<<B. Audio Device>>

[B-1] An audio device that uses an audio signal synchronization control device
in which the audio signal synchronization control device includes:
a host controller;
a plurality of audio devices;
a communication unit capable of performing broadcast communication, having a device control address separately set for the plurality of the audio devices and a synchronization address common to the devices, and configured to control the plurality of the audio devices from the host controller; and
a clock oscillator that supplies a clock of a same source oscillation to the plurality of the audio devices as a master clock,
the host controller performs broadcast communication with the plurality of the audio devices using a synchronization address, and
each of the plurality of the audio devices includes:
a synchronization control unit that generates a synchronization reset signal in a case where the broadcast communication is performed with the synchronization address;
a clock reset control unit that generates a timing signal in response to the synchronization reset signal generated by the synchronization control unit; and
an audio signal processing unit that processes audio data in accordance with the timing signal generated by the clock reset control unit.

[B-2] The audio device according to [B-1],
in which the communication unit is a bus topology capable of broadcast communication.

[B-3] The audio device according to [B-2],
in which the communication unit is an I2C bus.

[B-4] The audio device according to [B-3],
in which, in a case where the plurality of the audio devices receives the broadcast communication command at the synchronization address common to the devices, the plurality of the devices simultaneously accepts the broadcast communication command, and only a predetermined audio device based on identification information on the device performs ACK response.

[B-5] The audio device according to [B-3],
in which, in a case where the plurality of the audio devices receives the broadcast communication command at the device control address, only a selected audio device responds.

[B-6] The audio device according to any one of [B-1] to [B-5],
in which the synchronization control unit starts synchronization reset and releases the reset after a lapse of a predetermined time in a case where broadcast communication is performed using the synchronization address.

[B-7] The audio device according to any one of [B-1] to [B-6],
in which the clock reset control unit generates pulse clocks having frequencies of 1 $f_s$, 2 $f_s$, 4 $f_s$, and 128 $f_s$ in a case where a frequency of the master clock is 512 times a sampling frequency $f_s$ of the audio data.

[B-8] The audio device according to any one of [B-1] to [B-7], in which the audio signal processing unit processes the audio data in accordance with register contents set by the device control address and the synchronization address.

[B-9] The audio device according to any one of [B-1] to [B-8],
in which the audio signal processing unit includes a monaural multi-channel analog circuit unit and a stereo digital circuit unit.

[B-10] The audio device according to [B-9],
in which the host controller and the multi-channel analog circuit unit are connected by an I2C bus.

[B-11] The audio device according to [B-10],
in which the digital circuit unit incorporates a digital controller, and
the digital controller is a host controller of an interface different from the I2C bus.

[B-12] The audio device according to [B-11],
in which the digital circuit unit has a clock synchronization control unit configured to perform synchronization control, and
the digital controller supplies a synchronization start timing signal for performing synchronization control to the clock synchronization control unit.

[B-13] The audio device according to [B-12],
in which the synchronization start timing signal is a signal that transmits a synchronization start timing to the multi-channel analog circuit unit starting from the digital circuit unit.

[B-14] The audio device according to [B-12] or [B-13],
in which the clock synchronization control unit performs synchronization control on the basis of the synchronization start timing signal given from the digital controller.

[B-15] The audio device according to [B-12] or [B-13],
in which the clock synchronization control unit has a synchronization start timing fine adjustment unit capable of delaying the synchronization start timing to be transmitted to the synchronization control unit from a command issuance timing in unit of master clock.

[B-16] The audio device according to [B-15],
in which the synchronization start timing fine adjustment unit generates a toggle signal indicating a start timing of the synchronization reset signal and supplies the toggle signal to the synchronization control unit.

[B-17] The audio device according to [B-16],
in which the synchronization control unit receives the toggle signal from the synchronization start timing fine adjustment unit, generates a synchronization reset signal, and supplies the synchronization reset signal to the clock reset control unit.

[B-18] The audio device according to [B-17],
in which the clock reset control unit performs synchronization reset over a preset period and starts generation of a clock from synchronization reset release.

[B-19] The audio device according to any one of [B-12] to [B-18],
in which the digital circuit unit receives a synchronization control command from the digital controller, performs synchronization reset over a period designated in advance, and can perform clock generation again with a reset release timing as a starting point.

REFERENCE SIGNS LIST

10 Audio signal synchronization control device according to first embodiment
11, 21 Host controller
12 Lch audio device
13 Rch audio device
14, 24 I2C bus
15, 25 Clock oscillator
20 Audio signal synchronization control device according to second embodiment
22 Lch analog circuit unit
23 Rch analog circuit unit
26 Stereo digital circuit unit
100 Audio device according to third embodiment

The invention claimed is:

1. An audio signal synchronization control device, comprising:
a host controller;
a plurality of audio devices;
a communication unit capable of performing broadcast communication, having a device control address separately set for the plurality of audio devices and a synchronization address common to the plurality of audio devices, and configured to control the plurality of audio devices from the host controller; and
a clock oscillator that supplies a clock of a same source oscillation to the plurality of audio devices as a master clock,
wherein the host controller performs the broadcast communication with the plurality of audio devices using the synchronization address, and
each of the plurality of audio devices comprises:
a synchronization control unit that generates a synchronization reset signal in a case where the broadcast communication is performed with the synchronization address;
a clock reset control unit that generates a timing signal in response to the synchronization reset signal generated by the synchronization control unit; and
an audio signal processing unit that processes audio data in accordance with the timing signal generated by the clock reset control unit.

2. The audio signal synchronization control device according to claim 1,
wherein the communication unit is a bus topology capable of the broadcast communication.

3. The audio signal synchronization control device according to claim 2,
wherein the communication unit is an I2C bus.

4. The audio signal synchronization control device according to claim 3,
wherein, in a case where the plurality of audio devices receives a broadcast communication command at the synchronization address common to the plurality of audio devices, the plurality of audio devices simultaneously accepts the broadcast communication command, and only a predetermined audio device based on identification information on a device performs ACK response.

5. The audio signal synchronization control device according to claim 3,
wherein, in a case where the plurality of audio devices receives a broadcast communication command at the device control address, only a selected audio device responds.

6. The audio signal synchronization control device according to claim 1,
wherein the synchronization control unit starts synchronization reset and releases the synchronization reset after a lapse of a predetermined time in a case where the broadcast communication is performed using the synchronization address.

7. The audio signal synchronization control device according to claim 1,
wherein the clock reset control unit generates pulse clocks having frequencies of $1 f_s$, $2 f_s$, $4 f_s$, and $128 f_s$ in a case where a frequency of the master clock is 512 times a sampling frequency $f_s$ of the audio data.

8. The audio signal synchronization control device according to claim 1,
wherein the audio signal processing unit processes the audio data in accordance with register contents set by the device control address and the synchronization address.

9. The audio signal synchronization control device according to claim 1,
wherein the audio signal processing unit comprises a monaural multi-channel analog circuit unit and a stereo digital circuit unit.

10. The audio signal synchronization control device according to claim 9,
wherein the host controller and the monaural multi-channel analog circuit unit are connected by an I2C bus.

11. The audio signal synchronization control device according to claim 10, wherein
the stereo digital circuit unit incorporates a digital controller, and
the digital controller is the host controller of an interface different from the I2C bus.

12. The audio signal synchronization control device according to claim 11, wherein
- the stereo digital circuit unit comprises a clock synchronization control unit configured to perform synchronization control, and
- the digital controller supplies a synchronization start timing signal for performing synchronization control to the clock synchronization control unit.

13. The audio signal synchronization control device according to claim 12,
- wherein the synchronization start timing signal is a signal that transmits a synchronization start timing to the monaural multi-channel analog circuit unit starting from the stereo digital circuit unit.

14. The audio signal synchronization control device according to claim 12,
- wherein the clock synchronization control unit performs synchronization control on a basis of the synchronization start timing signal given from the digital controller.

15. The audio signal synchronization control device according to claim 12,
- wherein the clock synchronization control unit comprises a synchronization start timing fine adjustment unit capable of delaying the synchronization start timing to be transmitted to the synchronization control unit from a command issuance timing in unit of the master clock.

16. The audio signal synchronization control device according to claim 15,
- wherein the synchronization start timing fine adjustment unit generates a toggle signal indicating a start timing of the synchronization reset signal and supplies the toggle signal to the synchronization control unit.

17. The audio signal synchronization control device according to claim 16,
- wherein the synchronization control unit receives the toggle signal from the synchronization start timing fine adjustment unit, generates the synchronization reset signal, and supplies the synchronization reset signal to the clock reset control unit.

18. The audio signal synchronization control device according to claim 17,
- wherein the clock reset control unit performs synchronization reset over a preset period and starts generation of the clock from synchronization reset release.

19. The audio signal synchronization control device according to claim 12,
- wherein the stereo digital circuit unit receives a synchronization control command from the digital controller, performs synchronization reset over a period designated in advance, and can perform clock generation again with a reset release timing as a starting point.

20. An audio device that uses an audio signal synchronization control device, wherein the audio signal synchronization control device comprises:
- a host controller;
- a plurality of audio devices;
- a communication unit capable of performing broadcast communication, having a device control address separately set for the plurality of audio devices and a synchronization address common to the plurality of audio devices, and configured to control the plurality of the plurality of audio devices from the host controller; and
- a clock oscillator that supplies a clock of a same source oscillation to the plurality of audio devices as a master clock, wherein
- the host controller performs the broadcast communication with the plurality of audio devices using a synchronization address, and
- each of the plurality of audio devices comprises:
- a synchronization control unit that generates a synchronization reset signal in a case where the broadcast communication is performed with the synchronization address;
- a clock reset control unit that generates a timing signal in response to the synchronization reset signal generated by the synchronization control unit; and
- an audio signal processing unit that processes audio data in accordance with the timing signal generated by the clock reset control unit.

\* \* \* \* \*